H. S. GOVER.
SPRING TIRE.
APPLICATION FILED FEB. 13, 1914.
1,098,375.
Patented June 2, 1914.
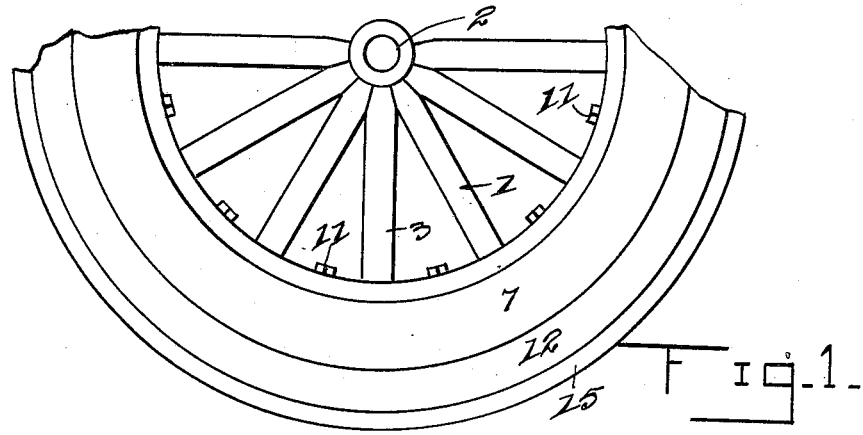
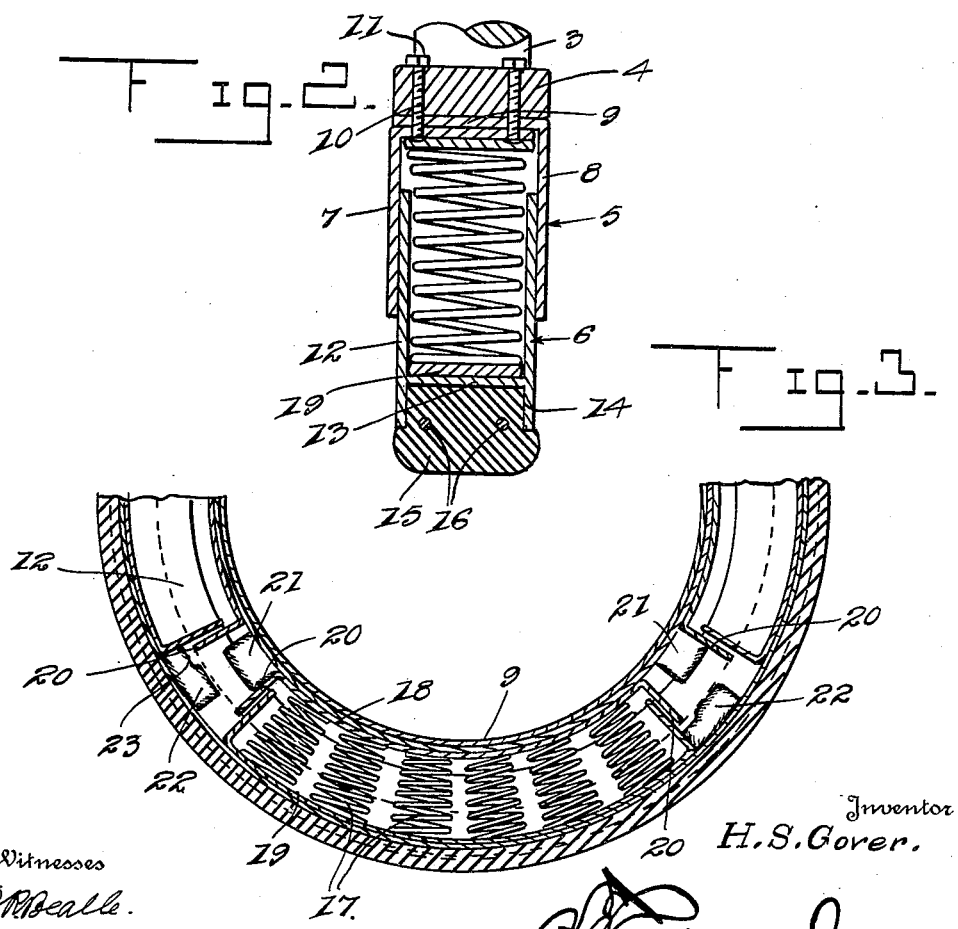
Witnesses
C. R. Bealle.
Chas. J. Chunn.
Inventor
H. S. Gover.
By _____
Attorney

UNITED STATES PATENT OFFICE.

HARRY S. GOVER, OF BEL AIR, MARYLAND.

SPRING-TIRE.

1,098,375.   Specification of Letters Patent.   Patented June 2, 1914.

Application filed February 13, 1914. Serial No. 818,521.

*To all whom it may concern:*

Be it known that I, HARRY S. GOVER, a citizen of the United States, residing at Bel Air, in the county of Harford and State of Maryland, have invented certain new and useful Improvements in Spring-Tires; and I do hereby declare the following to be a full, clear, and exact description of the invention, such as will enable others skilled in the art to which it appertains to make and use the same.

My invention relates to new and useful improvements in vehicle tires and resides in the provision of a spring tire which may be readily attached to a vehicle wheel and is so constructed as to provide great resiliency and durability.

An important object of my invention is to provide a spring tire which consists of inner and outer tire sections that are constructed and arranged in a novel manner and have interposed therebetween a plurality of sets of springs so arranged as to provide great resiliency and strength.

Another important object of my invention is to provide a tire of the character described which characterizes all of the resiliency of the pneumatic tire but is more durable and efficient than the pneumatic tire at present generally in use.

Another important object of my invention is to provide a tire of the character described which is readily demountable and constructed simply and cheaply.

The above and additional objects are accomplished by such means as are illustrated in the accompanying drawings, described in the following specification and then more particularly pointed out in the claims which are appended hereto and form a part of this application.

With reference to the drawings, wherein I have illustrated the preferred embodiment of my invention as it is reduced to practice, and throughout the several views of which similar reference numerals designate corresponding parts: Figure 1 is a fragmentary side elevation showing my tire in assembled position relative to a wheel. Fig. 2 is a vertical sectional view taken through the tire showing it attached to a portion of a wheel, and Fig. 3 is a fragmentary sectional view taken longitudinally through the tire showing the detail construction thereof.

Referring to the drawings by characters of reference, the numeral 1 designates as an entirety a wheel comprising a hub 2, spokes 3 and rim 4.

My improved spring tire comprises an inner metallic section designated 5 generally and an outer metallic section 6. The inner casing 5 comprises a pair of circumferential side plates 7 and 8. Each of these sides plates is provided with a lateral flange 9 on its inner edge. The flanges 9 extend at right angles to the plates 7 and 8 and are disposed in overlapping engagement with each other upon the rim 4 of the wheel 1. The flanges 9 are approximately equal to the width of the rim 4 and are secured thereon by a plurality of bolts 10 extending through the flanges and rim and having nuts 11 turned on their inner terminals. It will thus be seen that the plates 7 and 8 and flanges 9 form a casing which extends circumferentially with relation to the rim 4 of the wheel 1.

The outer casing 6 comprises spaced circumferential sides plates 12 that are connected by an integral outer circumferential plate 13. The plates 12 are disposed within the casing 5 and in engagement with the inner faces of the plates 7 and 8.

The outer plate 13 is disposed inwardly with relation to the outer edges of the plate 12 and provide tire securing flanges 14. Mounted between the flanges 14 and in engagement with the outer face of the plate 13 is a suitable cushion tire 15 having reinforcing rods or wires extending circumferentially therethrough and designated 16. It will thus be seen that the casing 6 is slidably mounted within the casing 5 and that the assembling thereof is readily provided by the plates 7 and 8 and flanges 9 comprising the casing 5. The removal of the nuts 11 from the bolts 10 facilitates the removal of the plates 7 and 8 comprising the casing 5. As cushioning means I provide a plurality of sections of springs 17. Each section is preferably formed of a single piece of spring material bent to form a plurality of expansive helical springs. The sections of springs are mounted within the casings 5 and 6, each section being spaced from the other.

As a means for holding the sections in the proper relation to each other and to the casings 5 and 6, I provide for each section of springs, arcuate plates 18 and 19. The plates 18 for each section of springs are positioned in engagement with the adjacent flange 9 of the plates 7 and 8 and are provided at their ends with right angularly extended flanges 20 which terminate at their outer ends in spaced relation to the outer plate 13 of the casing 6. The plates 19 are positioned in engagement with the inner face of the outer plate 13 of the casing 6 and are provided with end flanges similar to the ones 20 on the plates 18. The end flanges on the plates 19 are disposed in sliding engagement with the inner faces of the flanges 20 on the plates 18 and consequently the plates 19 are slightly shorter than the plates 18. The springs 17 are positioned between the flanges and the plates 18 and 19 with their inner terminals engaging the plates 18 and outer terminals engaging the plates 19. The springs of each section are arranged in spaced relation to each other and may be, if desired, secured to the plates 18 and 19 by some suitable fastening means. Carried upon the outermost of the flanges 9 are a plurality of lugs 21. These lugs 21 are arranged in spaced relation to each other upon the outer face of the outermost of the flanges 9 and are disposed within the space comprehended between the sections of springs and the plates 18 and 19. The lugs 21 are disposed in engagement and engage upon one side the flanges 20 at one end of each of the plates 18. The other side of the lug 21 is disposed in spaced relation to the adjacent flange 20 of the next adjacent section of springs and plates therefor. Carried upon the outer plate 13 are lugs 22. These lugs 22 are arranged upon the inner face of the plate 13 of the casing 6 and are disposed in the space comprehended between the flanges of the plates 18 and 19 of the sections of springs. One side of each of the lugs 22 engages the flange on one end of each of the plates 19. The lugs 22 are recessed as at 23 so as not to interfere with the sliding of the flanges on the plates 18 and 19 relative to each other. The lugs 21 and 22 act as bumpers as they are disposed to engage each other upon too great inward movement of the outer casing 6 and coöperating parts relative to the inner casing 5. The lugs 21 and 22 also serve to prevent circumferential sliding movement of the plates 18 and 19 for supporting the spring sections 17.

It will be readily seen with reference to the foregoing description and accompanying drawings that my improved spring tire may be readily assembled and disassembled. The side plates 7 and 8 comprising the inner casing 5 may be readily removed as will be clearly seen with reference to the foregoing description and accompanying drawings so that access to the springs may be had for inspection or repair. It will be noted that I have provided an extremely simple and inexpensive spring tire which is constructed so that accidental derangement is practically eliminated and great resiliency provided.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

What is claimed is:—

1. In a device of the character described, the combination with the rim of a wheel of an inner casing detachably secured to said rim, an outer casing slidably mounted within said inner casing, a cushion tire mounted upon said outer casing, a plurality of springs mounted between and within the inner and outer casings, said springs being arranged in sections, said sections being spaced from each other, curved plates interposed between the terminals of the springs and inner and outer sections, flanges formed on the ends of each of the plates and arranged in overlapping engagement with each other, and lugs carried upon the inner and outer casings and disposed between the sections of springs, said lugs engaging the flanges of said plates.

2. A spring tire comprising an inner casing, an outer casing slidably mounted within said inner casing, a plurality of sections of springs mounted within and between said casings and in spaced relation to each other, a tire carried by said outer casing, a plurality of pairs of curved plates mounted to engage the inner and outer terminals of the springs of each section of springs, said plates being disposed in engagement with the inner and outer casings, flanges formed on the ends of the plates at right angles thereto and disposed in an overlapping engagement with each other, and lugs carried by the inner and outer casings and engaging certain of the flanges of each plate to hold said plate against derangement, said lugs acting to engage each other upon too great inward movement of the outer casing relative to the inner casing.

In testimony whereof I affix my signature in presence of two witnesses.

HARRY S. GOVER.

Witnesses:
HENRY F. MITCHELL,
ANNA LEE WILSON.

---

Copies of this patent may be obtained for five cents each, by addressing the "Commissioner of Patents, Washington, D. C."